US009988982B2

(12) United States Patent
Delaunay

(10) Patent No.: US 9,988,982 B2
(45) Date of Patent: Jun. 5, 2018

(54) TURBINE ENGINE WITH A COMBUSTION CHAMBER OUTER FLANGE OF SANDWICH TYPE

(71) Applicant: SNECMA, Paris (FR)

(72) Inventor: Frederic Delaunay, Moissy-Cramayel (FR)

(73) Assignee: SNECMA, Paris (FR)

( * ) Notice: Subject to any disclaimer, the term of this patent is extended or adjusted under 35 U.S.C. 154(b) by 283 days.

(21) Appl. No.: 14/629,840

(22) Filed: Feb. 24, 2015

(65) Prior Publication Data

US 2015/0240714 A1    Aug. 27, 2015

(30) Foreign Application Priority Data

Feb. 27, 2014   (FR) ...................................... 14 51583

(51) Int. Cl.
*F02C 7/20* (2006.01)
*F02C 3/14* (2006.01)
(Continued)

(52) U.S. Cl.
CPC .................. *F02C 3/14* (2013.01); *F02C 7/18* (2013.01); *F02C 7/20* (2013.01); *F23R 3/46* (2013.01); *F23R 3/60* (2013.01); *F05D 2220/32* (2013.01); *F05D 2230/60* (2013.01); *F05D 2260/30* (2013.01)

(58) Field of Classification Search
CPC ...... F02C 3/14; F02C 7/18; F02C 7/20; F02C 7/28; F23R 3/002; F23R 3/46; F23R 3/60; F23R 2900/00005
See application file for complete search history.

(56) References Cited

U.S. PATENT DOCUMENTS 4,302,941 A * 12/1981 DuBell .................... F23R 3/002
                                                              60/755
5,289,677 A *  3/1994 Jarrell ...................... F23R 3/60
                                                              60/752
(Continued)

FOREIGN PATENT DOCUMENTS

EP    1 323 983 A2    7/2003
EP    1 486 732 A2   12/2004
EP    1 882 885 A2    1/2008

OTHER PUBLICATIONS

French Preliminary Search Report dated Oct. 27, 2014, in Patent Application No. FR 1451583, filed Feb. 27, 2014 (with English Translation of Category of Cited Documents).

*Primary Examiner* — Arun Goyal
(74) *Attorney, Agent, or Firm* — Oblon, McClelland, Maier & Neustadt, L.L.P.

(57) ABSTRACT

A turbine engine has inner and outer annular covers containing an annular combustion chamber and an annular nozzle. The combustion chamber is held in position inside the outer annular cover between two radial holder rings that are nested at least in part one within the other and that have their radially outer first ends secured to the outer annular cover by fasteners and their radially inner second ends in the form of combs holding in position between them a transverse rim of the annular combustion chamber so as to enable a cooling stream to flow towards the annular nozzle and so as to hold the annular combustion chamber axially while leaving it free to move at least radially.

11 Claims, 4 Drawing Sheets

(51) Int. Cl.
  *F23R 3/46* (2006.01)
  *F23R 3/60* (2006.01)
  *F02C 7/18* (2006.01)

(56) References Cited

U.S. PATENT DOCUMENTS

| | | | | |
|---|---|---|---|---|
| 7,900,461 | B2 * | 3/2011 | Varney | F01D 25/243 60/752 |
| 8,752,395 | B2 * | 6/2014 | McCormick | F23R 3/60 60/752 |
| 2003/0161727 | A1 | 8/2003 | MacLean et al. | |
| 2004/0250548 | A1 | 12/2004 | Howell et al. | |
| 2008/0008584 | A1 | 1/2008 | Shteyman et al. | |
| 2014/0190167 | A1 | 7/2014 | Shi et al. | |

* cited by examiner

TURBINE ENGINE WITH A COMBUSTION CHAMBER OUTER FLANGE OF SANDWICH TYPE

BACKGROUND OF THE INVENTION

The present invention relates to the specific field of turbine engines, and it relates more particularly to the problems that arise when mounting a combustion chamber in the casings of the turbine engine.

Conventionally, in a turbojet or a turboprop, the high-pressure turbine, and in particular its inlet nozzle (HPT nozzle), the combustion chamber, and the inner and outer coverings (or casings) of the combustion chamber are all made of metal or of metal alloy. In operation, the temperature field of the walls of the chamber and the mechanical loads that apply thereto give rise to movements at the ends of those walls. Those movements are made possible by the chamber having a flexible portion in the form of hairpins that connect together the zone for engagement with the casing (the fastener flange) and the zone of the flame tube. Nevertheless, that flexible hairpin is subjected to numerous forces that fluctuate during an operating cycle because of the thermal expansion differences that exist between the chamber and the casing. This can lead to fatigue, and in the extreme to breakage phenomena that then require the entire wall of the chamber to be replaced.

Furthermore, since the types of loading are numerous and difficult to identify accurately, it is found to be complicated to define an optimized shape when designing the part, such that it is often necessary to redesign the part in order to refine its shape until an acceptable compromise is achieved between flexibility and robustness.

Thus, in patent application FR 13/58899, the present Applicant has proposed having recourse to independent metal bands mounted between the combustion chamber and the annular coverings to take the place of conventional direct connections by means of flanges. That new mounting gives a great deal of satisfaction. Nevertheless, in certain modes of operation, it has been found that dynamic excitation by sound can lead to the hairpins of the outer band breaking.

OBJECT AND SUMMARY OF THE INVENTION

An object of the present invention is thus to mitigate those drawbacks by proposing a novel way of mounting the outer annular covering of the combustion chamber in its casing that is free from the above-mentioned constraints and that can easily withstand the differences in expansion that appear at high temperatures between the various parts (in particular by accommodating the movements due to the expansion), while ensuring that the combustion chamber is well held and properly centered in the annular covering. Another object of the invention is to propose mounting that takes best advantage of existing standard flanged fastener systems for combustion chambers.

These objects are achieved by a turbine engine having inner and outer annular covers, an annular combustion chamber having a longitudinal axis, and an annular nozzle, said annular combustion chamber being held in position in said outer annular cover between first and second radial holder rings having radially outer first ends fastened to said outer annular cover by fastener means and radially inner second ends that hold in position between them a transverse rim of said annular combustion chamber in such a manner as to hold said annular combustion chamber axially while leaving it free to move at least radially, the turbine engine being characterized in that said first and second radial holder rings are nested at least in part one within the other, and each of them presents a radial end in the form of a comb having its teeth leaving between them gaps that are directed towards the inside so as to allow a cooling stream to flow towards said annular nozzle.

Having recourse to such a sandwich engagement configuration between the flanges of the outer annular covering of the combustion chamber makes it possible to ensure both flexibility and the desired axial retention.

In an advantageous embodiment, said transverse rim is made up of teeth between which there are defined gaps that are directed towards the outside in order to allow a cooling stream to flow towards said annular nozzle.

Preferably, said first radial holder ring has a radial first portion pierced by orifices that are regularly distributed around said annular combustion chamber in order to receive said fastener means, an axial second portion extending said radial first portion upstream over a length corresponding to the axial dimension of said transverse rim, and itself being extended radially towards the inside of said annular combustion chamber by a radial third portion constituting said comb-shaped radial end.

Advantageously, said second radial holder ring as a crenellated first radial portion pierced by orifices for receiving said fastener means and extended by a second radial portion constituting said comb-shaped radial end, said crenellated first radial portion being nested in complementary manner in a radial setback of said first radial portion of said first radial holder ring provided in register with each of the gaps of said first ring.

Thus, once said first and second rings have been assembled together by nesting, the respective gaps of said first and second rings may be substantially in alignment with one another and with the gaps in the rim of said annular combustion chamber, so as to allow the cooling stream to pass under satisfactory conditions.

Preferably, each of said open spaces lying between said combs of said first radial holder ring or of said second radial holder ring is closed by a band mounted at the radially inner end of said teeth and thereby forming an integral portion of said first or second radial holder rings.

Advantageously, at said radial second portion, one of said first and second radial holder rings has a plurality of axially-projecting extensions forming peripheral rims of oblong-shaped passages that lie between the teeth of said transverse rim, each presenting a height that is less than the height of said teeth, the other one of said first and second radial holder rings having at said radial third portion a series of openings of the same shape as said oblong-shaped passages and coming into contact with said peripheral rims via their inner faces so that, regardless of the radial position of said annular combustion chamber relative to said covers, the flow of said cooling stream towards said annular nozzle remains unchanged.

Preferably, said fastener means are constituted by a plurality of screw-and-nut systems.

BRIEF DESCRIPTION OF THE DRAWINGS

The characteristics and advantages of the present invention appear better from the following description made by way of nonlimiting indication and with reference to the accompanying drawings, in which.

DETAILED DESCRIPTION OF AN EMBODIMENT

Figure 4:
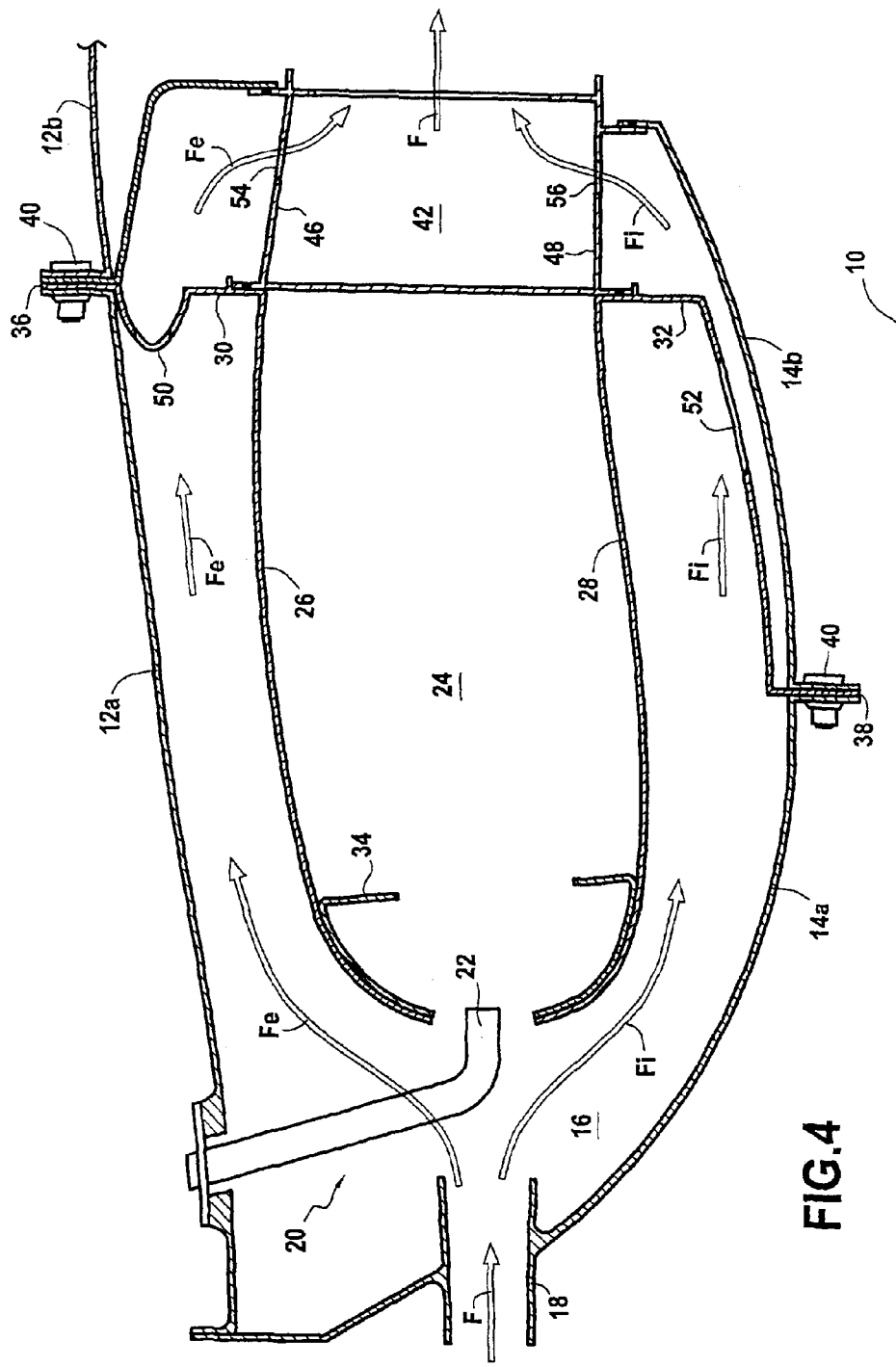
FIG. 4 is a diagrammatic axial half-section view of a central zone of a prior art turbine engine.

FIG. 4 shows an axial half-section view of a central portion of a turbojet or a turboprop (referred to as a turbine engine in the description below) of the prior art and comprising:

an outer annular cover (or outer casing) made up of two portions 12a and 12b, having a longitudinal axis 10;

an inner annular cover (or inner casing) made up of two portions 14a and 14b, and located coaxially inside the outer casing; and an annular space 16 lying between the two covers 12a, 12b and 14a, 14b and receiving a compressed oxidizer, generally air, coming from an upstream compressor (not shown) of the turbine engine via an annular diffusion duct 18, defining a general gas flow stream F, the gas flowing by convention from upstream to downstream;

this space 16 comprising in the gas flow direction:

an injection assembly formed by a plurality of injection systems 20 that are regularly distributed around the duct 18, each having a fuel injector nozzle 22 fastened to an upstream portion 12a of the outer annular cover (for simplification purposes, the mixer and the deflector that are conventionally associated with each injector nozzle are not shown in the drawings);

the combustion chamber 24 formed by an outer axial wall 26 and an inner axial wall 28, both coaxial about a longitudinal axis 10 and each connected downstream via a respective connection wall 30, 32 to the outer or inner annular cover, and a transverse wall 34 that constitutes the end wall of the combustion chamber, the two connection walls 30, 32 being fastened to the outer and inner annular covers by bolts 40 via annular fastener flanges 36, 38; and an annular nozzle 42 forming an inlet stage for a high-pressure turbine (not shown) and conventionally comprising a plurality of stationary vanes (lying outside of the section plane) that are mounted between an outer circular platform 46 and an inner circular platform 48, which platforms are both connected to the outer and inner annular covers.

First through orifices 50, 52 provided in the two connection walls 30, 32 of the combustion chamber 24, and second through orifices 54, 56 provided in the outer and inner platforms 46 and 48 of the nozzle 42 are also provided to cool the stationary vanes of the nozzle at the inlet to the rotor of the high-pressure turbine by using the compressed oxidizer F available at the outlet from the diffusion duct 18 and flowing as two streams Fe and Fi on either side of the combustion chamber 24.

According to the invention, and in order to mitigate the differences between the coefficients of thermal expansion that exist between the walls of the combustion chamber and the annular covers, and in particular at the outer contact interfaces between the chamber and the nozzle where temperature gradients are the greatest, while also ensuring that the chamber is held and positioned inside the casing, it is proposed to interpose the downstream end of the combustion chamber between two rings that are closely engaged one within the other and both of which are secured to the outer annular cover.

Figure 1A:
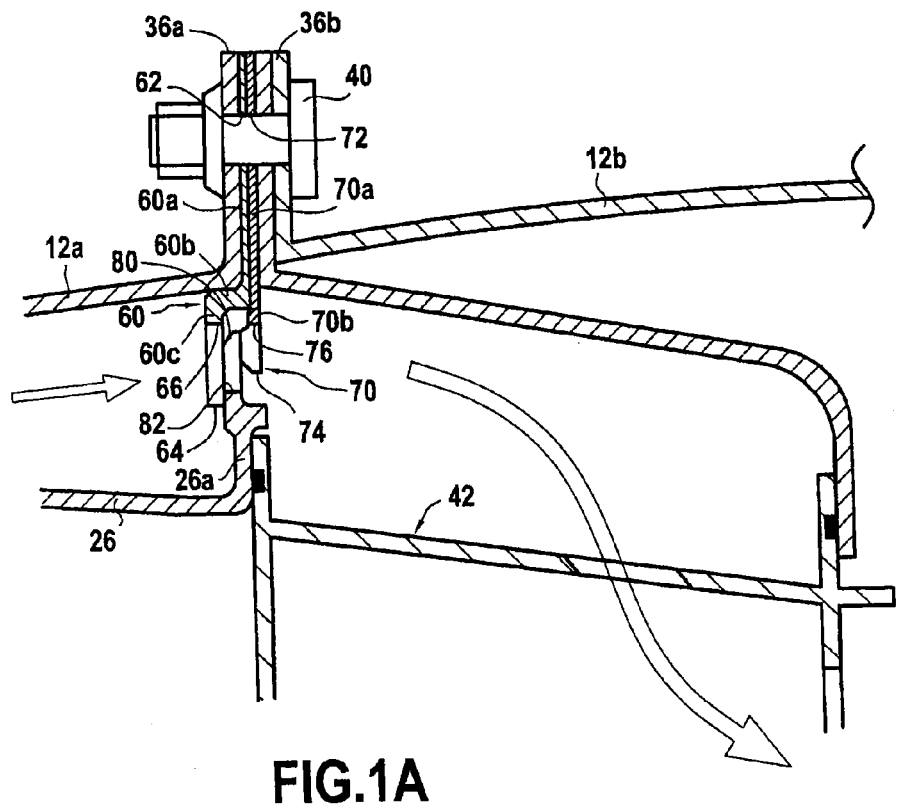
FIG. 1A is a fragmentary diagrammatic view in axial half-section of a connection zone between a turbine engine combustion chamber and its outer casing in accordance with the invention.
Figure 1B:
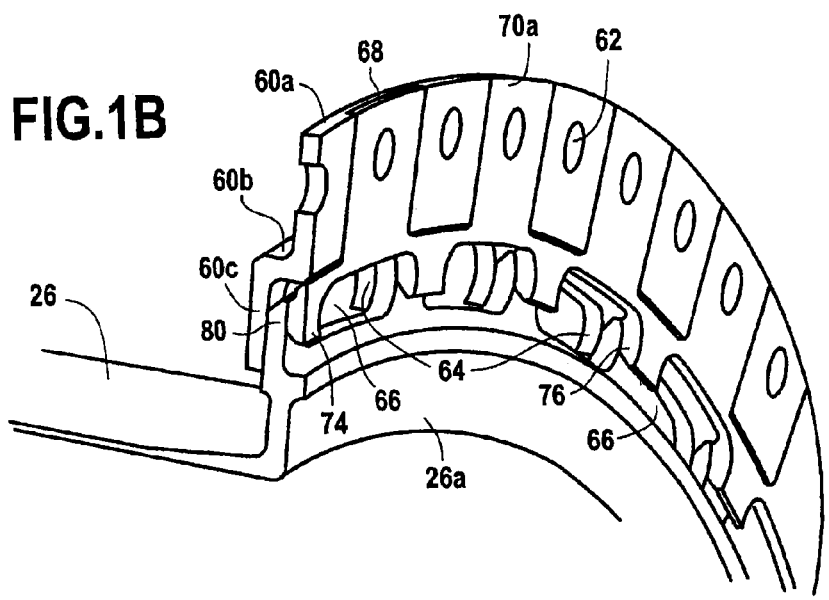
FIG. 1B shows a perspective view of the radial holder rings for holding the outer wall of the combustion chamber to the outer casing of FIG. 1A.

More precisely, and as shown in FIGS. 1A and 1B, at its downstream end the combustion chamber has a transverse rim 26a that presents a toothed shape, which rim 26a is held in position in the annular cover by being sandwiched between radially inner first ends of first and second radial holder rings 60 and 70 (i.e. ends that extend substantially radially inwards towards the longitudinal axis 10). The holder rings are engaged at least in part one within the other, and they have radially outer second ends, opposite from the first ends, that are themselves engaged between the respective standard connection flanges 36a, 36b of the upstream and downstream portions 12a and 12b of the outer annular cover, and that are thus secured to said outer annular cover by the fastener means of a prior art nut-and-bolt system 40. Nevertheless, it is also possible to envisage fastening by bolting, crimping, or riveting.

In this first embodiment, the first radial holder ring 60 presents a section comprising three portions: a radial first portion 60a pierced by orifices 62 that are regularly distributed around the combustion chamber for the purpose of receiving the fastener means 40; an axial second portion 60b extending the first portion upstream over a length corresponding to the axial dimension (the thickness) of the transverse rim 26a; and that is itself extended towards the inside of the combustion chamber by a comb-shaped radial third portion 60c having teeth 64 leaving between them gaps 66 directed towards the inside of the combustion chamber and large enough to pass the cooling stream Fe and thus avoid penalizing the effectiveness of the air flows feeding the annular nozzle 42.

The sum of the cross sections of these gaps is preferably calibrated as a function of the flow rate desired for this cooling stream.

Radial setbacks 68 are formed in the radial first portion 60a in register with each of the gaps 66 in the first ring 60, these radial setbacks 68 being adapted to receive in complementary manner (nesting) respective crenellations of a first radial portion 70a of the second radial holder ring 70, themselves also pierced by orifices 72 and serving, like the orifices 62 in the facing first radial holder ring, to receive the fastener means 40. This crenellated first radial portion is extended by a second radial portion 70b that is likewise comb-shaped (so that together, the first and second portions form a kind of succession of upside-down Y-shapes that are adjacent via one of their branches), with the second portion having teeth 74 in the same manner as the teeth 64 of the first radial holder ring leaving between them gaps 76 that are directed towards the inside in order to pass the cooling stream Fe towards the annular nozzle. Once the first and second rings 60 and 70 have been nested together, the respective gaps 66 and 76 of these first and second rings are substantially in alignment.

In this configuration, the teeth 64, 74 of the first and second radial holder rings 60, 70 hold between them the teeth 80 of the transverse rim 26a of the annular combustion chamber, and thus serve to hold the chamber axially, while leaving it free to move radially and tangentially. The extent of this freedom of movement could naturally be greater or smaller as a function of the friction coefficients of the materials or of the coatings forming the first and second radial holder rings. Between the teeth 80 of the rim 26*a* there are outwardly-directed gaps 82 for the purpose of passing the cooling stream. Once the rim 26*a* is held in position between the first and second rings 60 and 70, which are themselves nested together, the gaps 82 in the rim 26*a* tend to be substantially in alignment with the gaps 66 and 76 of the first and second rings 60 and 70 respectively. This ensures that the cooling stream flows under conditions that are satisfactory.

Figure 2A:
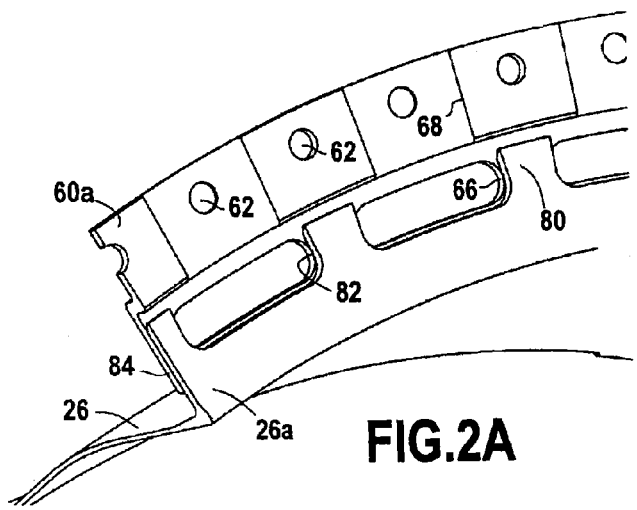
FIGS. 2A, 2B, and 2C show a first variant embodiment of the radial holder rings.
Figure 2B:
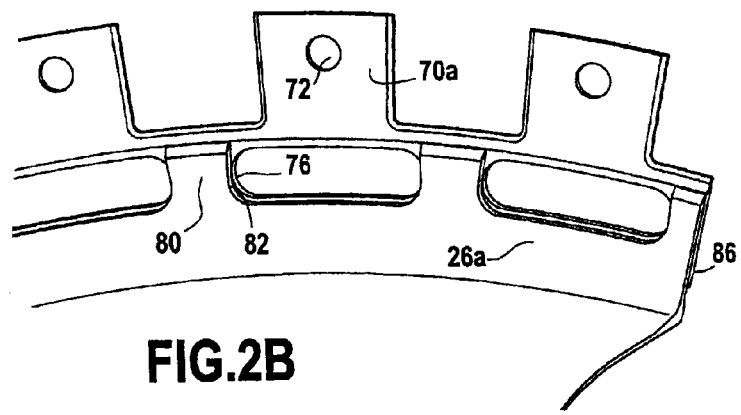
Figure 2C:
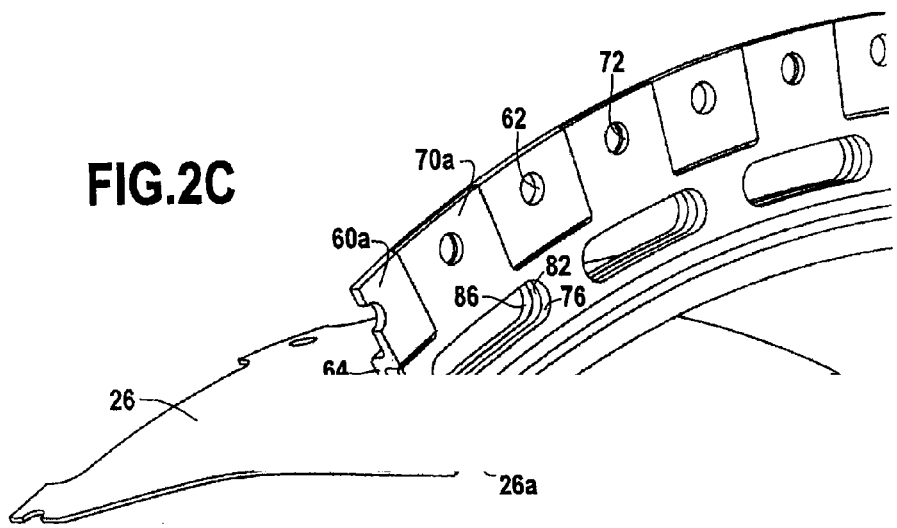

FIGS. 2A, 2B, and 2C show a second embodiment of the invention in which the gaps 66, 76 between the teeth 64, 74 of the first and second radial holder rings are no longer completely open towards the inside of the combustion chamber, but each of them is closed by a band 84, 86 mounted at the radially inner ends of the teeth and thereby forming an integral portion of each of the two rings. In this variant, the flow of the cooling stream at the connection with the nozzle is under better control, even if total continuity cannot be ensured. It should be observed that this closure of the gaps between the teeth may be provided for only one of the two rings.

Figure 3A:
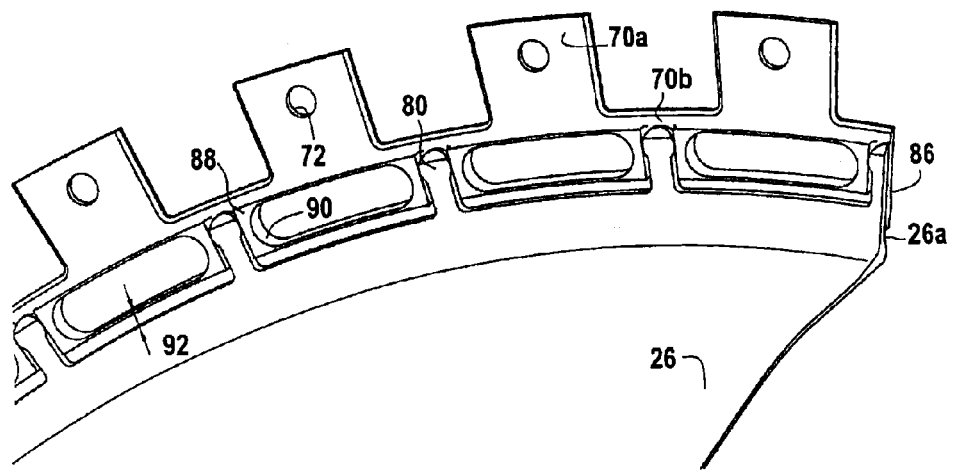
FIGS. 3A and 3B show a second variant embodiment of the outer casing of FIG. 1.
Figure 3B:
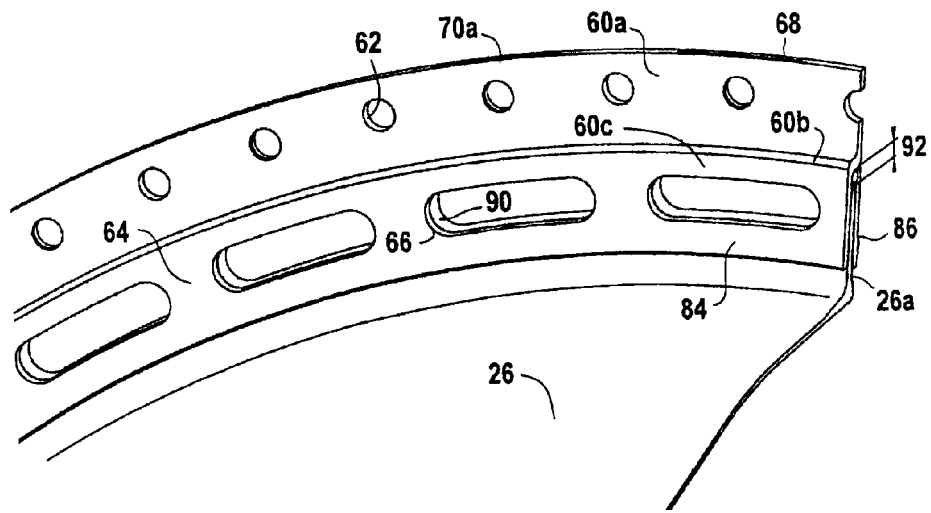

When it is desired to restrict the freedom of the combustion chamber to move tangentially, it is proposed to have recourse to the embodiment of FIGS. 3A and 3B, in which one of the radial holder rings, e.g. the second radial holder ring 70, has a plurality of extensions projecting axially upstream from its second radial portion 70*b*, which extensions form peripheral rims 88 of passages 90 that are of oblong shape and that are to be located exactly between the teeth 80 of the rim 26*a*, to within assembly tolerances, in order to define accurately the flow space for the cooling stream. Nevertheless, in order to ensure the chamber continues to be free to move radially, each of the passages as formed in this way is of a height that is less than the height of the teeth in the transverse rim 26*a* against which they are engaged so as to leave an empty space 92 between the radially inner bases of these passages and of the bases of the teeth 80, which empty space 92 corresponds to the space that remains at rest between the tips of the teeth 80 and the axial second portion 60*b* of the first radial holder ring.

Also, in order to ensure continuity of flow for the cooling stream, the first radial holder ring 60 includes a series of openings 94 at its radial third portion 60*c*, which openings 94 have the same shape as the passages 90 in the second radial portion 70*b* of the second radial holder ring and come into contact with the peripheral rims 88 via their inside faces. Thus, whatever the radial position of the combustion chamber, the flow of the cooling stream (the air passage profile) towards the annular nozzle remains the same since no disturbing element affects the cooling stream, unlike prior art embodiments in which tangential movement of the chamber can reduce this profile.

The invention as proposed in this way serves in particular to obtain the following advantages:
- the friction induced by holding the chamber in position between the rings serves to damp vibration, thereby making it possible significantly to reduce the risk of hairpins breaking;
- in the event of local and/or total breakage of the radial holder ring, it is possible in a maintenance operation to change a part of cost that is small compared with the cost of a complete combustion chamber wall; and
- when seeking to optimize the shape of the flange, it is only the radial holder rings that need to be modified.

The invention claimed is:

1. A turbine engine comprising:
inner annular cover and outer annular cover defining therebetween an annular space for receiving a gas flow stream;
an annular combustion chamber having a longitudinal axis; and
an annular nozzle,
wherein said annular combustion chamber is held in position in said outer annular cover between a first radial holder ring and a second radial holder ring, each of the first radial holder ring and the second radial holder ring having radially outer first ends located outside the gas flow stream sandwiched between flanges of the outer annular cover and fastened to said outer annular cover by fastener means and radially inner second ends located inside the gas flow stream that sandwich a transverse rim of said annular combustion chamber between the radially inner second ends of the first radial holder ring and the second radial holder ring in such a manner as to hold said annular combustion chamber axially while leaving said annular combustion chamber free to move at least radially, and
wherein said radially outer first ends of said first radial holder ring and said second radial holder ring abut each other and are nested at least in part one within the other, and said radially inner second ends of said first radial holder ring and said second radial holder ring form of a comb having teeth with gaps therebetween that are directed radially inward and in alignment with one another and with gaps of the transverse rim so as to allow a cooling stream to flow through the first radial holder ring and the second radial holder ring towards said annular nozzle.

2. The turbine engine according to claim 1, wherein said transverse rim is made up of teeth between which the gaps of the transverse rim are defined that are directed radially outward in order to allow said cooling stream to flow towards said annular nozzle.

3. The turbine engine according to claim 2, wherein a first radial portion of the first radial holder ring is pierced by orifices that are regularly distributed around said annular combustion chamber in order to receive said fastener means, and a second radial portion of said first radial holder ring extends axially upstream over a length corresponding to an axial dimension of said transverse rim.

4. The turbine engine according to claim 3, wherein said second radial holder ring has a crenellated first radial portion pierced by orifices for receiving said fastener means and extended by a second radial portion constituting said radially inner second ends in the form of a comb, said crenellated first radial portion being nested in complementary manner in a radial setback of said first radial portion of said first radial holder ring provided in register with each of the gaps of said first radial holder ring.

5. The turbine engine according to claim 4, wherein once said first radial holder ring and said second radial holder ring have been assembled together by nesting, the gaps of said first radial holder ring and said second radial holder ring are substantially in alignment with one another and with the gaps of the transverse rim of said annular combustion chamber.

6. The turbine engine according to claim 4, wherein each of said gaps of said comb of said first radial holder ring or of said second radial holder ring is closed by a band mounted at an radially inner end of said teeth and thereby forming an integral portion of said first radial holder ring or said second radial holder ring.

7. The turbine engine according to claim 4, wherein at said second radial portion, one of said first radial holder ring and said second radial holder ring has a plurality of axially-projecting extensions forming peripheral rims of oblong-shaped passages that lie between the teeth of said transverse rim, each of the axially-projecting extensions presenting a height that is less than a height of said teeth of said transverse rim, other one of said first radial holder ring and said second radial holder ring having at a radial third portion a series of openings of a same shape as said oblong-shaped passages and coming into contact with said peripheral rims via inner faces thereof so that, regardless of a radial position of said annular combustion chamber relative to said inner annular cover and outer annular cover, the flow of said cooling stream towards said annular nozzle remains unchanged.

8. The turbine engine, according to claim 1, wherein said fastener means are constituted by a plurality of screw-and-nut systems.

9. The turbine engine according to claim 1, wherein the first radial holder ring is independent from the outer annular cover.

10. The turbine engine according to claim 1, wherein the second radial holder ring is independent from the annular nozzle.

11. The turbine engine according to claim 1, wherein the first radial holder ring includes an axial portion extending axially between a radially inner end of a first radial portion of the first radial holder ring including the radially outer first ends of the first radial holder ring and a radially outer end of a second radial portion of the first radial holder ring including the radially inner second ends of the first radial holder ring.

* * * * *